United States Patent
Carson

(10) Patent No.: US 7,590,039 B2
(45) Date of Patent: Sep. 15, 2009

(54) RADIAL SEPARATION DISTANCE DETERMINATION FOR A DATA STORAGE MEDIUM

(75) Inventor: Douglas M. Carson, Cushing, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 0 days.

(21) Appl. No.: 11/314,612

(22) Filed: Dec. 20, 2005

(65) Prior Publication Data

US 2006/0133232 A1 Jun. 22, 2006

Related U.S. Application Data

(60) Provisional application No. 60/638,269, filed on Dec. 20, 2004.

(51) Int. Cl.
*G11B 7/004* (2006.01)
(52) U.S. Cl. ..................................... 369/53.2
(58) Field of Classification Search ........................ None
See application file for complete search history.

(56) References Cited

U.S. PATENT DOCUMENTS

| | | | |
|---|---|---|---|
| 5,606,543 A | 2/1997 | Sugiyama | |
| 5,703,858 A | 12/1997 | Mitchell et al. | |
| 5,724,327 A | 3/1998 | Timmermans et al. | |
| 5,809,006 A | 9/1998 | Davis et al. | |
| 5,831,964 A | 11/1998 | Tanaka | |
| 6,430,125 B1 * | 8/2002 | Alon et al. | 369/44.32 |
| 6,477,124 B2 | 11/2002 | Carson | |
| 6,721,245 B1 | 4/2004 | Yamashita et al. | |
| 6,775,227 B2 | 8/2004 | Watanabe et al. | |
| 6,914,862 B2 | 7/2005 | Tsai et al. | |
| 2005/0208257 A1 * | 9/2005 | Cheong et al. | 428/64.4 |

FOREIGN PATENT DOCUMENTS

JP 2001-216711 A 8/2001

* cited by examiner

*Primary Examiner*—Michael V Battaglia
(74) *Attorney, Agent, or Firm*—Fellers, Snider, et al.

(57) ABSTRACT

An apparatus and method for determining a separation distance between radial locations on a data storage medium, such as an optical disc. A first number of channel bits are detected at a first radial location of the medium, and a second number of channel bits are detected at a second radial location. The radial separation distance therebetween is determined in relation to the respective first and second numbers. Preferably, the first radial location is a first track on the medium, and the second radial location is a second track on the medium. Preferably, a motor rotates the medium, a data transducer transduces readback signals from the first and second locations, and a processor determines the respective numbers of bits from the readback signals. The radial separation distance is preferably used to authenticate the medium.

16 Claims, 3 Drawing Sheets

RADIAL SEPARATION DISTANCE DETERMINATION FOR A DATA STORAGE MEDIUM

RELATED APPLICATIONS

The present application makes a claim of domestic priority to U.S. Provisional Patent Application No. 60/638,269 filed Dec. 20, 2004.

FIELD OF THE INVENTION

The present invention relates generally to the field of data storage technology and more particularly, but without limitation, to the accurate determination of radial separation distance between adjacent locations (e.g., track pitch) on a data storage medium, such as an optical disc.

BACKGROUND

Optical discs are one type of recording media used to store a wide variety of digitally encoded data. Such discs are usually portable in nature and can be played in a variety of settings.

A typical optical disc comprises a circular disc having one or more recording layers of light reflective material embedded in a refractive substrate. Each recording layer records data along a series of concentric tracks (such as discrete closed tracks or along a continuous spiral).

A data transducing head uses a laser or similar light source to output a readback signal based on the different reflectivities of areas along the tracks. Decoding circuitry decodes the user data for output by the appropriate playback device. Optical discs can be pre-recorded (pressed) replica discs, or can be written by the end user (e.g., recordable—write once; re-writable—write many).

Both pre-recorded and writable discs are often manufactured using one or more stampers, which in turn are created during a mastering process utilizing a laser beam recorder (LBR). In order for the optical discs to have optimal readability, it is desirable to measure and confirm various parameters to be within the associated specifications for such discs. One such parameter is track pitch.

Track pitch can be defined as the radial separation distance between the centerlines of immediately adjacent tracks, whether closed discrete concentric tracks or tracks within a continuous spiral. Some formats of optical discs (such as compact discs, CDs, and digital versatile discs, DVDs) specify a constant track pitch from lead-in to lead-out. Other formats of optical discs (such as high density DVD, HD-DVD, and Blu-Ray Discs, BDs) specify different track pitches at different locations within the recording layers.

Prior art methodologies for obtaining individual track pitch measurements on a recording medium have generally been difficult to carry out, and have sometimes included the use of expensive and cumbersome equipment such as laser inferometers and atomic force microscopes (AFMs). Accordingly, there remains a continued need for advancements in the art in the manner in which the track pitch between adjacent tracks on a recording medium such as an optical disc can be readily and accurately determined. It is to this and other needs that the present invention is generally directed.

SUMMARY OF THE INVENTION

Preferred embodiments of the present invention are generally directed to an apparatus and method for determining a radial separation distance between radial locations on a data storage medium, such as an optical disc.

In accordance with some preferred embodiments, the method generally comprises steps of detecting a first number of channel bits at a first radial location of a storage medium, detecting a second number of channel bits at a second radial location of the medium, and determining the radial separation distance between the first and second radial locations in relation to the respective first and second numbers. Preferably, the first radial location is a first track on the medium, and the second radial location is a second track on the medium.

The first number of channel bits is preferably detected by bringing a data transducer into radial alignment with the first location, rotating the medium while transducing a readback signal from data stored at the first location, and accumulating the first number of channel bits while the medium is rotated over a selected rotational distance. The selected rotational distance preferably corresponds to one complete rotation of the medium. The second number of channel bits is preferably determined in like manner.

Once the radial separation distance is determined, the method further preferably comprises an authenticating step in which the medium is authenticated in relation to the determined radial separation distance. The medium preferably stores data at a constant linear density and is preferably characterized as a DVD-compatible optical disc.

In accordance with further preferred embodiments, an apparatus is provided comprising a processor configured to carry out the above steps. The apparatus further preferably comprises a motor configured to rotate the medium, and a transducer configured to transduce data from the medium during rotation of the medium by the motor. The apparatus is preferably characterized as an optical disc readback system.

Various other features and advantages of the claimed invention will be apparent from a review of the following detailed description in conjunction with a review of the appended drawings.

DETAILED DESCRIPTION

Figure 1:
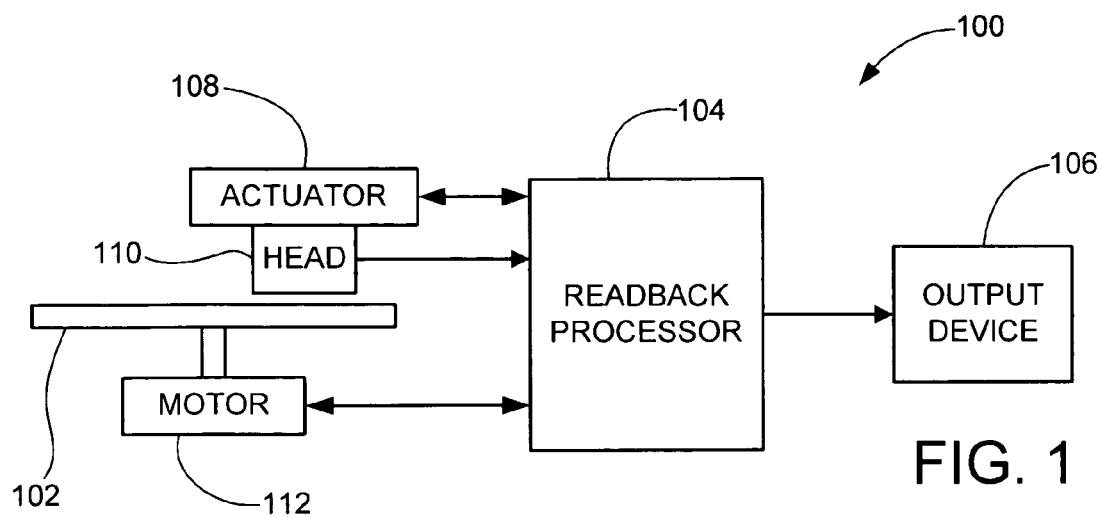
FIG. 1 generally sets forth a functional block diagram for a readback system configured and operated in accordance with preferred embodiments of the present invention.

FIG. 1 shows a readback system 100 used to read back data from an optical disc 102. For purposes of the present discussion, the disc 102 is contemplated as having a multi-layer, digital versatile disc (DVD) compatible format such as DVD-9, although such is not limiting.

The readback system 100 includes a readback processor 104 which communicates with an input/output (I/O) device 106. Depending upon the type of data stored on the disc 102 (i.e., DVD-ROM, DVD audio, DVD video, etc.), the device 106 can comprise a personal computer, an optical disc audio or video player, a gaming console, etc.

The readback processor 104 controls an actuator 108, optical pickup (transducing head) 110 and disc motor 112. During a readback operation the readback processor 104 processes a modulated signal transduced by the head 110 to provide originally stored data from the disc 102 to the device 106.

While not necessarily required, it is contemplated for purposes of the present discussion that the disc 102 employs constant linear density recording at least over a portion of the disc. Constant linear density recording can be defined as a characteristic whereby any arbitrary distance (d) along one or more tracks will contain nominally the same number of channel clock bits regardless of the angular or radial location on the medium. Similarly, any arbitrary number of channel clock bits will nominally take up the same linear distance along the track or tracks of the medium irrespective of angular or radial location.

With regard to channel bits, those skilled in the art will recognize that optical discs such as 102 often employ m/n bit encoding so that each m-bit sequence of input data is converted to n-bits stored to the disc. DVDs generally employ 8/16 encoding, although other schemes are known. The recording process generally provides a sequence of symbols over a defined range, such as 3T-14T where T is the channel clock, with light detectable edges (pit and land transitions) corresponding to each logical "1" in the encoded sequence.

Figure 2:
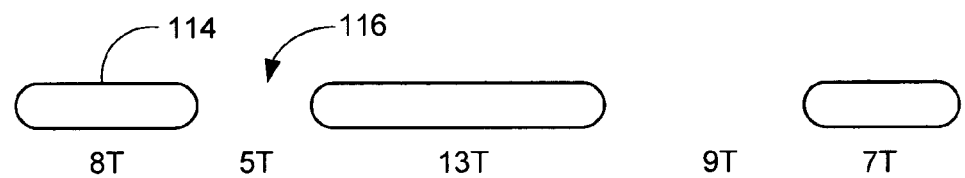
FIG. 2 shows a portion of a data storage medium set forth in FIG. 1.

With reference to FIG. 2, a portion of the disc 102 is shown with pits 114 and lands (spaces) 116 along a selected track. The exemplary pit and land sequence in FIG. 2 is 8T-5T-13T-9T-7T, for a total of 8+5+13+9+7=42 channel bits. When constant linear density recording is employed, individual recording symbol lengths will nominally have the same respective sizes irrespective of radial location on the disc; that is, all 3T symbols on the disc will generally have the same nominal physical length, all 4T symbols will generally have the same nominal physical length, and so on.

Figure 3:
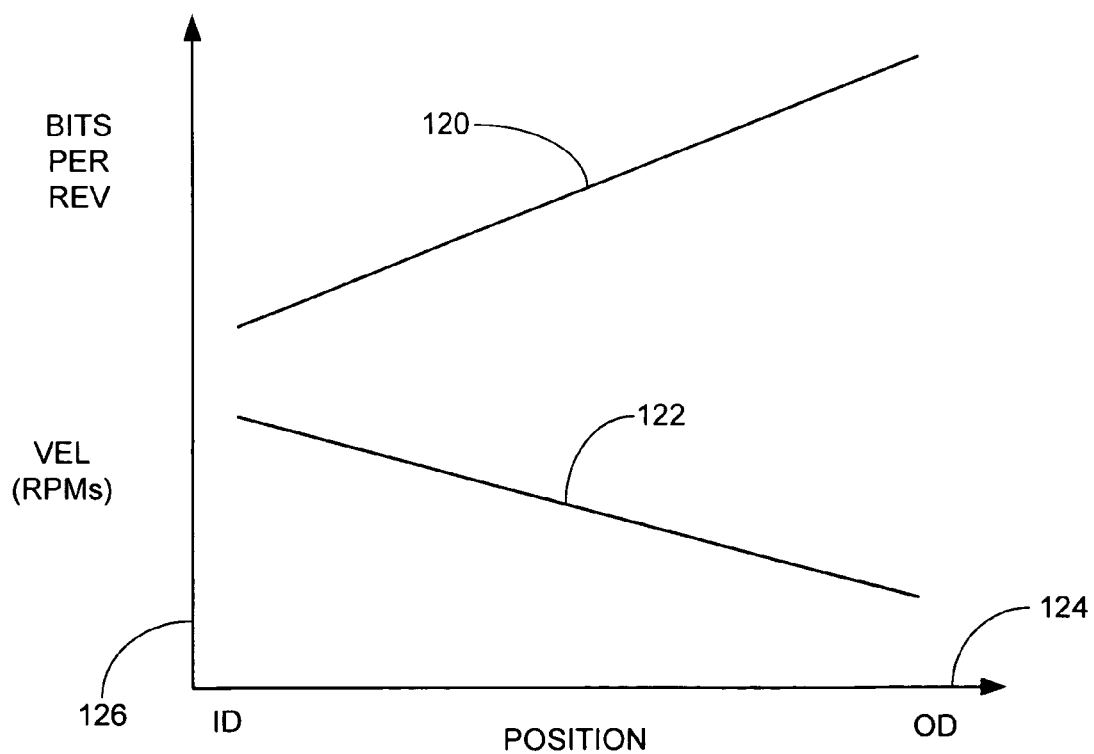
FIG. 3 generally illustrates in graphical form a relationship between data density and medium rotational velocity from an innermost data storage radius (ID) to an outermost data storage radius (OD) of the medium.

FIG. 3 provides graphical representations of a generalized data density curve 120 and a generalized rotational velocity profile curve 122 for the disc 102. The curves 120, 122 are plotted against a common position x-axis 124 and a common amplitude y-axis 126.

The data density curve 120 of FIG. 3 shows the number of bits per revolution on the disc 102 from the innermost diameter (ID) to the outermost diameter (OD) to increase at a substantially linear rate. The rotational velocity profile curve 122 indicates that servo control circuitry of the readback processor 104 will control the rotation of the disc 102 from ID to OD as shown so as to nominally maintain the data from curve 120 passing the transducer 110 at a constant rate.

Those skilled in the art will recognize that the rate of rotation of the disc motor 112 will generally be continuously adjusted so that the readback frequency of the readback signal is nominally locked to the channel clock frequency. Of course, the curves 120, 122 are merely exemplary in nature, so that discs having characteristics other than that shown in FIG. 3 can readily be evaluated in accordance with the various preferred embodiments discussed herein.

Figure 4:
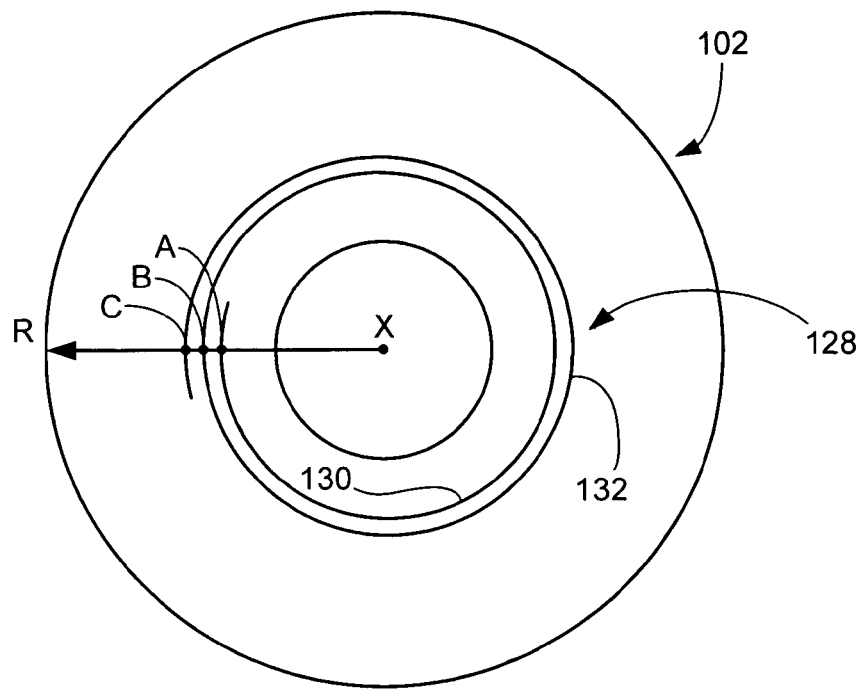
FIG. 4 provides a schematic representation of first and second radial locations of a data storage medium on which data tracks are defined as a portion of a continuous spiral.

FIG. 4 provides a first generalized representation of the disc 102. Data from a selected recording layer are arranged along a continuous spiral (a portion of which is shown at 128). The disc 102 has radius R (as denoted by vector X-R). A first track 130 is defined along the spiral 128 from point A to point B, and a second track 132 is defined along the spiral from point B to point C. The respective tracks 130, 132 have a track pitch TP as defined by the distance A to B (or B to C). For reference, it will be understood that the rate of radial change of the spiral 128 in FIG. 3 is greatly exaggerated for clarity of illustration.

If a first radius $r_1$ is defined for the first track 130 as the distance X to A, and a second radius $r_2$ is defined for the second track 132 as the distance X to B, then it follows that the track pitch TP can be expressed as a function of the respective circumferential lengths of the tracks, $C_1$ and $C_2$, as follows:

$$TP=(r_2-r_1)=(C_2-C_1)/2\pi \quad (1)$$

Using constant linear density, the circumferential lengths $C_1, C_2$ of equation (1) are functions of the number of channel bits recorded thereon. Accordingly, the track pitch between the respective tracks 130, 132 can be determined in relation to the increase in the number of channel bits on track 132 as compared to track 130.

Using a DVD-9 by way of example, this format generally has the following specified parameters.

TABLE 1

| | |
|---|---|
| Linear Velocity | 3.84 meters/second (m/s) |
| Channel Clock Rate | 26.16 Megahertz (MHz) |
| Track Pitch | 0.74 microns (0.00074 millimeters, mm) |

From Table 1 it can be seen that the motor 112 will be continuously adjusted to nominally maintain the linear velocity (line speed) of the disc 102 at about 3.84 m/s. The motor will further be nominally maintained at this rate so that the rate at which data are transduced from the disc 102 is nominally equal to 26.16 MHz (using 1× reading). The nominal track pitch (radial separation distance) between the centerlines of adjacent tracks (or other corresponding features of the tracks) will be 0.74 microns, or $7.4\times10^{-7}$ meters, m.

The number of bits per radial micron (distance along vector R) can be determined as:

$$\text{(Channel Clock Rate)/(Linear Velocity)}=26.16/3.84=6.8125 \text{ bits/micron} \quad (2)$$

The circumferential increase per revolution ($\Delta C$) can be determined as:

$$\text{(Track Pitch)}(2\pi)=(0.74)(2\pi)=4.6496 \text{ microns/rev} \quad (3)$$

From this it can be seen that the nominal increase in the number of channel bits over each successive revolution of the disc 102 will be:

$$(6.8125 \text{ channel bits/micron})(4.6496 \text{ microns/rev}) = 31.6751 \text{ channel bits/rev} \quad (4)$$

That is, for a given track, the next adjacent track toward the OD should have about 31.6751 additional channel bits thereon. Generally, assuming constant linear density recording and an absence of manufacturing errors, a greater number of additional bits would indicate a wider than nominal track spacing, whereas a reduced number of additional bits would indicate a narrower than nominal track spacing.

From the foregoing, the particular track pitch TP between two adjacent tracks in a constant linear density zone can be determined in accordance with the following relation:

$$TP = \frac{(\Delta Bits)(\text{Velocity})}{(\text{ClockRate})(2\pi)} \quad (5)$$

where ΔBits is the difference in the number of channel clock bits on the second track as compared to the first track, Velocity is the rotational velocity (line speed) of the motor, and Clock Rate is the channel clock rate (frequency).

It will be noted that equation (5) can be utilized in a number of ways. With reference again to FIG. 3, the track pitch between the first and second tracks 130, 132 can be determined by using the standard velocity (3.84 m/s) and standard clock rate (26.16 MHz) and counting the number of bits over each revolution.

In a preferred embodiment, a counter and a once-around (index) or similar timing signal from the motor are used to determine the ΔBits value. For example, a first number of bits $B_1$ can be counted between a first and a second index pulse for the first track, a second number of bits $B_2$ can be counted between the second index pulse and a third pulse, and the Δbits value can be determined in relation to $(B_2-B_1)$.

When greater accuracy is desired, it will be noted that motor speed signals can be used to obtain instantaneous and average values for the Velocity value which can then be inserted into equation (5) as shown. Additionally or alternatively, the actual clock frequency rate can be measured to determine an actual Clock Rate for insertion into equation (5).

Figure 5:
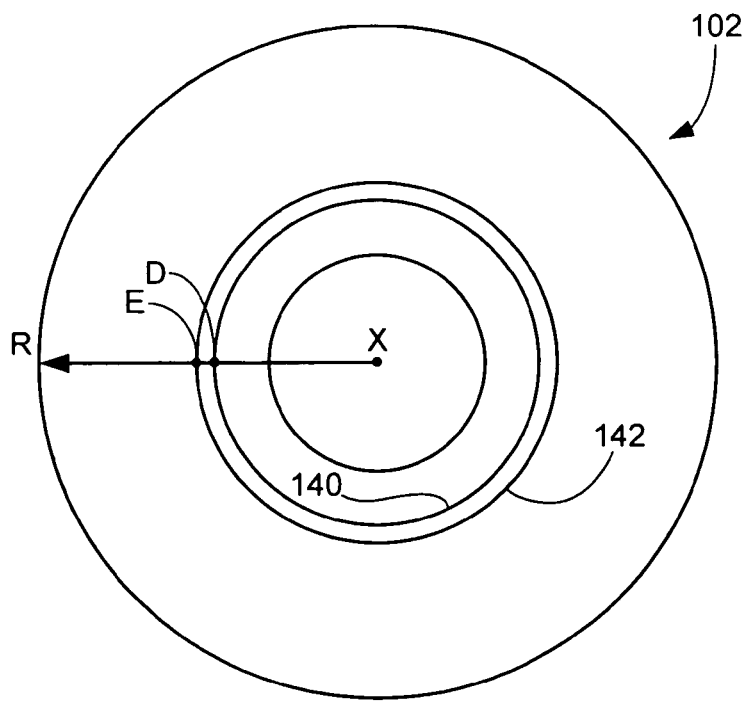
FIG. 5 provides a schematic representation of first and second radial locations of a data storage medium on which data tracks are defined as contiguous, nested concentric rings.

The foregoing relationship set forth in equation (5) is equally applicable to recording media that utilize closed concentric tracks in lieu of a continuous spiral. FIG. 5 provides an alternative configuration for the disc 102. As before, the disc 102 has a radius R (vector X-R), a first track 140 (radius X-D) and a second track 142 (radius X-E).

As before, the track pitch TP (distance D-E) can be determined in relation to the difference in the number of channel bits on the second track 142 as compared to the first track 140. Actual measurements or baseline values for motor velocity and channel clock rate can also be obtained as before.

The foregoing methodology allows the track pitch to be easily and accurately determined for any two respective areas on a medium, including areas less than a full track length and areas that constitute more than a full track length. This can be advantageously employed during the manufacturing of discs to verify masters, stampers, and production discs to ensure conformity to the requisite standards.

The methodology can readily be adapted to verify different zones on a particular disc where different track densities are employed (such as with the aforementioned HD-DVD and BD formats). For example, the recently proposed HD formats (ROM, Re-writable and Recordable) all generally use the same lead-in structure including track pitch (0.68 micron) velocity and recording mode (CLV). HD-ROM has a different track pitch in the program area (0.40), HD-Re has a track pitch of 0.34 and is recorded in ZCAV mode in the program area.

It will be noted that the disclosed methodology also provides the ability to detect other characteristics of the medium. For example, if both rotations have the same time and same number channel bits, then this process may indicate the use of constant angular velocity recording. If the second rotation has more channel bits but a disproportionate rotation time as the first (or vice versa), then this process may indicate the use of variations in the respective sizes of the individual pits and lands such as disclosed in U.S. Pat. No. 6,477,124 to Carson. Thus, the method has utility in the area of disc forensics and copy protection systems as well.

It is also apparent from the foregoing that if time and channel bit per revolution measurements were made during the actual mastering process in an LBR, then the same measurements can be used to verify rotational accuracy per track of the LBR during mastering. That is, if the time and channel bits per revolution are both proportional, then the linear density could be verified as constant.

The disclosed method of computing track pitch can be used on any constant linear density recording medium where the linear density is known. This method can also be used to measure the radial distance between any two arbitrary tracks, including tracks that are immediately adjacent as well as tracks that are separated by one or more rotations.

Average track density over a selected area can also be determined. By way of illustration, with reference again to FIG. 5, in an alternative embodiment it is contemplated that a number of intervening tracks are disposed between the tracks 140, 142 (such intervening tracks are not shown in this example). The track pitch value between tracks 140, 142 thus represents the separation distance between these particular tracks, as before. An average, individual track pitch $TP_{AVG}$ can be determined using the following relation:

$$TP_{AVG} = \frac{TP}{n+1} \qquad (6)$$

where TP is determined in accordance with equation (5), and n is the number of intermediary tracks between the boundary tracks used to determine TP. Using a concrete example, if track 140 has track address 1 (i.e., a first track), and track 142 has track address 10 (i.e., the tenth track from track 1), then there will be n=8 tracks separating tracks 1 and 10. The average individual track pitch for this portion of the disc can be calculated as $TP_{1-10}/(8+1)=TP_{1-10}/9$.

Figure 6:
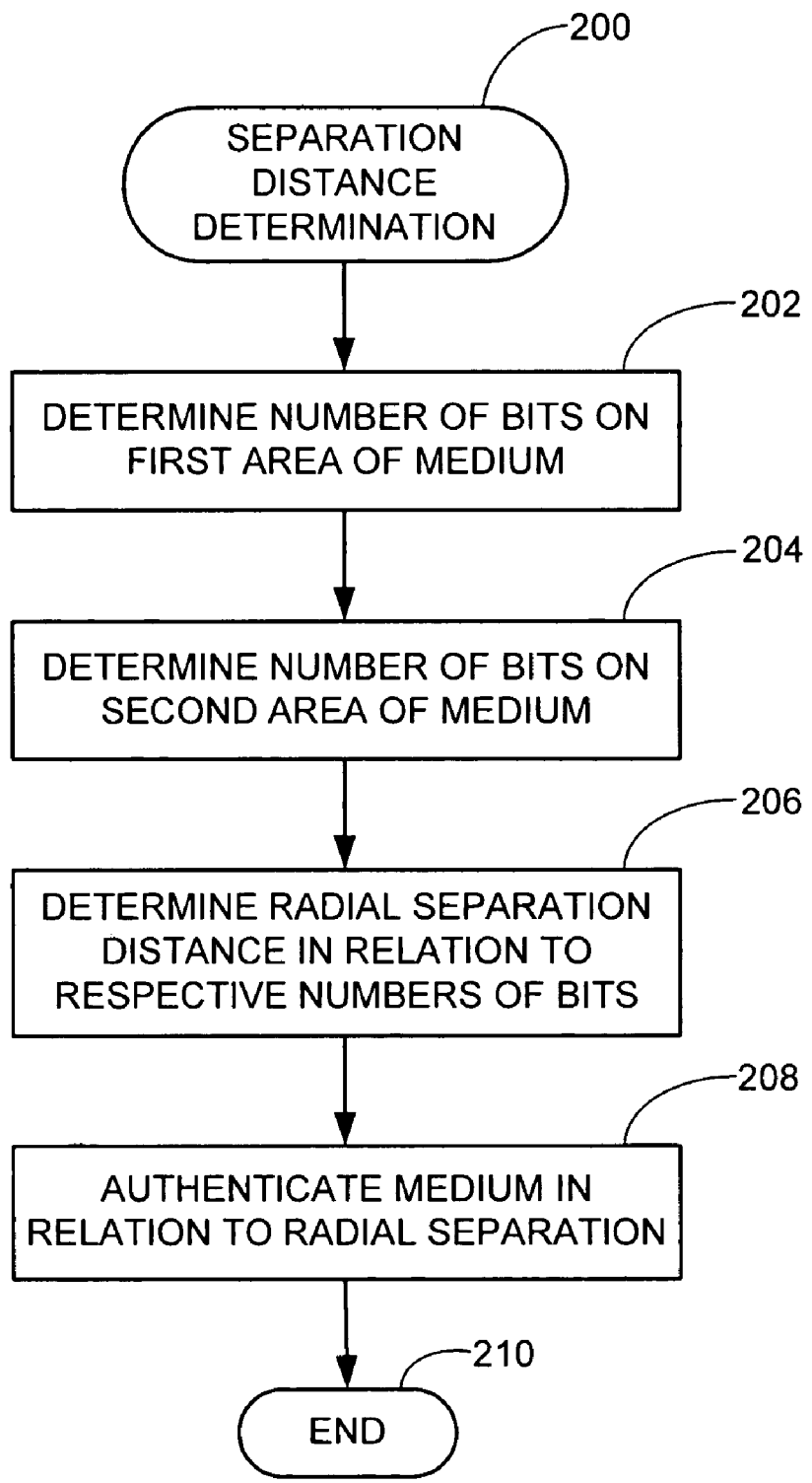
FIG. 6 is a flow chart for a SEPARATION DISTANCE DETERMINATION routine, generally illustrative of steps carried out in accordance with preferred embodiments of the present invention.

FIG. 6 sets forth a SEPARATION DISTANCE DETERMINATION routine 200, setting forth steps in accordance with preferred embodiments of the present invention to determine a radial separation distance between two different locations on a data storage medium.

At step 202, a first number of bits at a first radial location of the medium is detected. This preferably includes moving a transducer (such as head 110 in FIG. 1) into radial alignment with the first radial location and subsequent operation of the transducer to obtain a readback signal therefrom. Appropriate counter circuitry (not shown) is preferably used as discussed above to accumulate the number of bits at the first radial location.

If the first location corresponds to an entire track, then once-around index pulses from the motor rotating the medium (such as 112) can readily be used to establish the start and end times for this count accumulation. However, if the first location is a non-integral track count (e.g., one-half of a track, 2½ tracks, etc.), then other mechanisms can readily be utilized to determine the appropriate start and stop times for the count accumulation. As mentioned above, instantaneous velocity control signals can be used, as well as an external encoder, etc. to identify the angular rotational distance over which the medium has traveled during the count accumulation.

It will be noted at this point that the exemplary embodiments set forth above have preferably accumulated the number of bits over the selected rotational (angular) distance of medium rotation. In an alternative embodiment, a preselected threshold count is established (e.g., X number of channel bits) and the rotational distance necessary to accumulate this threshold count is identified. In such case, the ratio of respective rotational distances can be used in lieu of the ratio of respective bit counts to identify the separation distance.

For example, the first radial location can be determined with reference to a particular sector address, at which point the system seeks to this address and then reads a selected amount of data following this address (such as a predetermined number of sectors). The angular distance that the medium rotates during this data access is tracked and accumulated.

Continuing with FIG. 6, at step 204 a second number of bits at a second radial location of the medium is detected. This is preferably contemplated as being carried out in the same manner as at step 202, except that the transducer accesses the bits at the second radial location at step 204 as compared to the first radial location at step 202.

The radial separation distance between the first and second locations is next determined at step 206. When each of the first and second locations corresponds to a complete track, the radial separation distance is preferably calculated in accordance with equation (5). On the other hand, if each of the first and second locations corresponds to some other quantum of medium rotation besides one complete track, the respective bit counts are preferably normalized to a bits/track value prior to application of equation (5).

If respective radial distances are measured for a given number of bits, then these values are likewise preferably normalized to arrive at respective bits/track values prior to application of equation (5). It will be noted that in this latter example the radial separation distance is still determined in relation to the respective number of accumulated bits from the respective medium locations.

It will be noted that other calculation methodologies can be used at step 206 as desired besides that set forth by equation (5). An average track pitch for a number of intervening tracks can also be determined at step 206, such as set forth by equation (6).

The radial separation distance identified at step 206 is thereafter preferably used during a medium authentication operation at step 208, after which the routine ends at 210. The particular authentication carried out at step 208 will depend on the particular circumstances. In a manufacturing process control context, correspondence to medium specifications can be verified for master and/or replicated media. In an operational context, the track pitch can be used to identify a particular operational zone in which the first and second locations are disposed. In a copy protection system context, a required radial separation distance value can be required prior to granting further access to the medium.

It will be noted that this has particular value in recordable media, where the locations for the storage of data are generally predetermined by the configuration of the media. For example, wiggle pregroove and other modulated information are often used to pre-identify where particular sectors are to be recorded to a medium. Hence, it is contemplated that certain locations of a recordable medium can be particularly configured to have a pre-determined radial separation distance therebetween, and application routines or other mechanisms can be used to require verification of this radial separation distance prior to authorization of the medium.

Accordingly, the routine 200 of FIG. 6 can be wholly carried out by a readback system such as 100, alone or in conjunction with a host computer with which the readback system is associated. The routine 200 can also be implemented as a portion of a laser beam recorder (LBR) or other manufacturing and/or test equipment.

While the respective first and second radial locations have been preferably identified as respective tracks, it will be clear that such is not necessarily required. The first and second radial locations can be disposed on different recording layers when the storage medium incorporates multiple recording layers.

From the foregoing it will now be recognized that the various embodiments presented herein generally operate to respectively identify the numbers of bits per unit length for the first and second locations, and then determine the radial separation distance in relation to these numbers. It follows that the use of a data transducer to detect the bits (such as 110 in FIG. 1) and a motor to rotate the medium during such detection (such as 112 in FIG. 1) are preferred, but not necessarily required.

Rather, it is expressly contemplated that other approaches can be used to obtain the respective numbers of bits, including imaging the respective areas while the medium is in a non-rotational state and detecting the bits/unit length from such images. Imaging equipment is commonly known and used in media manufacturing and could readily be adapted using the foregoing discussion to carry out the invention as disclosed herein.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

In addition, although the embodiments described herein are directed to the determination of track pitch in an optical disc with nominally constant linear density tracks, it will be appreciated by those skilled in the art that such embodiments are for purposes of illustration and are not limiting, as other types of applications can readily be used without departing from the scope of the claimed invention.

What is claimed is:

1. An apparatus comprising a processor configured to determine a radial separation distance between any two arbitrarily selected radial locations of unknown physical radii on a storage medium by detecting a first number of channel bits at a first said radial location of the medium, detecting a second number of channel bits at a second said radial location of the medium, and determining the radial separation distance in relation to the respective first and second numbers.

2. The apparatus of claim 1, wherein the first radial location is a first track on a first recording layer of the medium, wherein the second radial location is a second track on a different, second recording layer of the medium, and wherein the radial separation distance comprises a track pitch value between said first and second tracks.

3. The apparatus of claim 1, further comprising a motor configured to rotate the medium, and a transducer configured to transduce data from the medium during rotation of the medium by the motor.

4. The apparatus of claim 3, wherein the processor is configured to radially align the data transducer with the first location, to instruct the motor to rotate the medium while the data transducer transduces a readback signal from data stored at the first location, and to accumulate the first number of channel bits while the medium is rotated over a selected rotational distance.

5. The method of claim 4, wherein the selected rotational distance nominally corresponds to one complete rotation of the medium.

6. The method of claim 4, wherein the selected rotational distance is obtained in relation to a once-per-revolution index signal from the motor.

7. The method of claim 3, wherein the processor is configured to radially align the data transducer with the first location, to instruct the motor to rotate the medium while the data transducer transduces a readback signal from data stored at the first location, and to determine a rotational distance traveled by the medium during accumulation of the first number of channel bits.

8. The apparatus of claim 1, wherein the processor is further configured to authenticate the medium as an authorized copy in relation to the determined radial separation distance.

9. The apparatus of claim 1, wherein the medium stores data at a nominally constant linear density from an innermost data storage radius to an outermost data storage radius of the medium.

10. The apparatus of claim 1, wherein the medium stores data at a nominally constant track density from an innermost data storage radius to an outermost data storage radius of the medium.

11. The apparatus of claim 1, characterized as an optical disc readback system.

12. A method comprising:
  moving a transducer to a first radial location on a rotatable storage medium, the first radial location located at an unknown radial distance from a center of the medium;
  accumulating a first number of channel bits as the transducer reads data from the first radial location;
  moving the transducer to a second radial location on the storage medium, the second radial location located at an unknown radial distance from a center of the medium;
  accumulating a second number of channel bits as the transducer reads data from the second radial location; and
  determining a radial separation distance between the first and second radial locations in relation to the respective first and second numbers of channel bits.

13. The method of claim 12, wherein the rotatable storage medium comprises a lead-in area with a first track pitch and a program area with a second track pitch different from the first track pitch.

14. The method of claim 12, wherein the rotatable storage medium is a recordable storage medium with wiggle pre-groove information stored thereon to pre-identify where particular sectors are to be recorded to a medium.

15. The method of claim 14, further comprising a step of authorizing access to the storage medium in relation to the radial separation distance determined during the determining step.

16. The method of claim 12, wherein the determining step comprises identifying a difference between the first and second numbers of channel bits, and identifying the radial separation distance in relation to said difference.

* * * * *

UNITED STATES PATENT AND TRADEMARK OFFICE
CERTIFICATE OF CORRECTION

PATENT NO. : 7,590,039 B2  
APPLICATION NO. : 11/314612  
DATED : September 15, 2009  
INVENTOR(S) : Douglas M. Carson Page 1 of 1

It is certified that error appears in the above-identified patent and that said Letters Patent is hereby corrected as shown below:

In Col. 8, line 62
replace "The method of"
with "The apparatus of."

In Col. 8, line 65
replace "The method of"
with "The apparatus of."

In Col. 9, line 1
replace "The method of"
with "The apparatus of."

Signed and Sealed this

Twenty-fourth Day of November, 2009

David J. Kappos
*Director of the United States Patent and Trademark Office*